United States Patent
Deka et al.

(10) Patent No.: US 7,904,481 B1
(45) Date of Patent: Mar. 8, 2011

(54) WORKFORCE MANAGEMENT SYSTEM

(75) Inventors: Kaushik Deka, Quincy, MA (US); Jason Fama, Redwood City, CA (US); Geoff Chappell, Belfast, ME (US); Mike Zeoli, Pembroke, MA (US); Amit Kumar, Quincy, MA (US)

(73) Assignee: Verint Systems Inc., Santa Clara, CA (US)

( * ) Notice: Subject to any disclaimer, the term of this patent is extended or adjusted under 35 U.S.C. 154(b) by 328 days.

(21) Appl. No.: 12/014,688

(22) Filed: Jan. 15, 2008

Related U.S. Application Data

(60) Provisional application No. 61/020,316, filed on Jan. 10, 2008, provisional application No. 61/020,974, filed on Jan. 14, 2008.

(51) Int. Cl.
*G06F 7/00* (2006.01)
*G06F 17/30* (2006.01)

(52) U.S. Cl. ................ 707/799; 707/810; 705/8; 705/9

(58) Field of Classification Search ............. 707/999.001–999.004, 799, 810; 705/7–9
See application file for complete search history.

(56) References Cited

U.S. PATENT DOCUMENTS

| | | | | |
|---|---|---|---|---|
| 5,465,328 | A * | 11/1995 | Dievendorff et al. | 707/999.202 |
| 6,098,047 | A * | 8/2000 | Oku et al. | 705/7 |
| 6,115,646 | A * | 9/2000 | Fiszman et al. | 700/181 |
| 6,574,605 | B1 * | 6/2003 | Sanders et al. | 705/8 |
| 6,578,006 | B1 * | 6/2003 | Saito et al. | 705/9 |
| 7,337,950 | B2 * | 3/2008 | DeVault | 705/38 |
| 7,707,055 | B2 * | 4/2010 | Behmoiras et al. | 705/8 |
| 2002/0040312 | A1 * | 4/2002 | Dhar et al. | 705/8 |
| 2002/0040339 | A1 * | 4/2002 | Dhar et al. | 705/38 |
| 2003/0200130 | A1 * | 10/2003 | Kall et al. | 705/8 |
| 2003/0217053 | A1 * | 11/2003 | Bachman et al. | 707/4 |
| 2004/0039623 | A1 * | 2/2004 | Setteducati | 705/8 |
| 2004/0054685 | A1 * | 3/2004 | Rahn et al. | 707/102 |
| 2004/0133487 | A1 * | 7/2004 | Hanagan et al. | 705/34 |
| 2005/0027651 | A1 * | 2/2005 | DeVault | 705/38 |
| 2006/0235730 | A1 * | 10/2006 | Politano et al. | 705/4 |
| 2007/0208606 | A1 * | 9/2007 | MacKay et al. | 705/9 |
| 2007/0288261 | A1 * | 12/2007 | Burke et al. | 705/2 |
| 2008/0069335 | A1 * | 3/2008 | Parker | 379/265.06 |
| 2009/0024432 | A1 * | 1/2009 | Bauters et al. | 705/8 |
| 2009/0254487 | A1 * | 10/2009 | Dhar et al. | 705/80 |

OTHER PUBLICATIONS

Berlemont et al.—"Integration of Real-Time Services in User-Space Linux"—2004 pp. 1-13 Linuxfordevices.com.*
Russell et al.—"Workflow Resource Patterns"—The 17th conference on WMP, 2005 pp. 1-73 PSU.edu.*

* cited by examiner

*Primary Examiner* — John E Breene
*Assistant Examiner* — Anh Ly

(57) ABSTRACT

A system and method for collecting work volume data where a work process is modeled into work queues. A link is created between one of the modeled work queues and an implied work queue. Upon the receipt of a first work event, information is updated that is associated with the first work queue. Based upon the receipt of the fist work event and the link, a first implied work event is generated. Based on the first implied work event, information associated with the first implied work queue is updated.

14 Claims, 5 Drawing Sheets

WORKFORCE MANAGEMENT SYSTEM

RELATED APPLICATIONS

This application hereby claims the benefit of and priority to U.S. Provisional Patent Application No. 61/020,316, titled "WORKFORCE MANAGEMENT SYSTEM", filed on Jan. 10, 2008, and which is hereby incorporated by reference in its entirety. This application also hereby claims the benefit of and priority to U.S. Provisional Patent Application No. 61/020,974, titled "WORKFORCE MANAGEMENT SYSTEM", filed on Jan. 14, 2008, and which is hereby incorporated by reference in its entirety.

TECHNICAL FIELD

The invention is related to the field of resource management systems, and in particular, to workforce management systems.

TECHNICAL BACKGROUND

Existing resource management systems are able to track events in the life of a project or work flow. For example, a call that is received in a call center can be tracked through each step of the call from when the call is received until the call is completed. Other types of resource management systems allow tracking of tasks as they are completed. For example, project management software is used to track events as they are completed in a project. However, these resource management systems have difficulty tracking events and resources where the events cannot be tracked in real time. As a result, these types of tasks and resources may not be tracked. This lack of transparency in resource management means that resources are not always allocated efficiently.

TECHNICAL SUMMARY

A method for collecting work volume data is disclosed. A work process is modeled into work queues. A link is created between a work queue and an implied work queue. Upon receiving a work event information about the work queue is updated. Based upon the received work event and the link, an implied work event is generated. The implied work event causes information about an implied work queue to be updated. The implied work event may also additional implied work events to be generated.

A system for collecting work volume data is disclosed. A modeler models a workflow into work queues. A link creator creates a link between a work queue and an implied work queue. A receiver receives work events. Upon receiving a work event, an updater updates information about the work queue. Based upon a received work event and a link, a generator generates an implied work event. The implied work event causes the updater to update information about an implied work queue. The implied work event may also cause the generator to generate additional implied work events.

Further embodiments include creating a link based on historical data. A second link is created from the work event to a second implied work event. A second link is crated between the first implied work event and a second implied work event. The first implied work event can be created based on time, percentages, work volume, units of work, and work in progress. A second implied work event is generated and information about the second implied work event is recorded.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

FIGS. 1-5 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
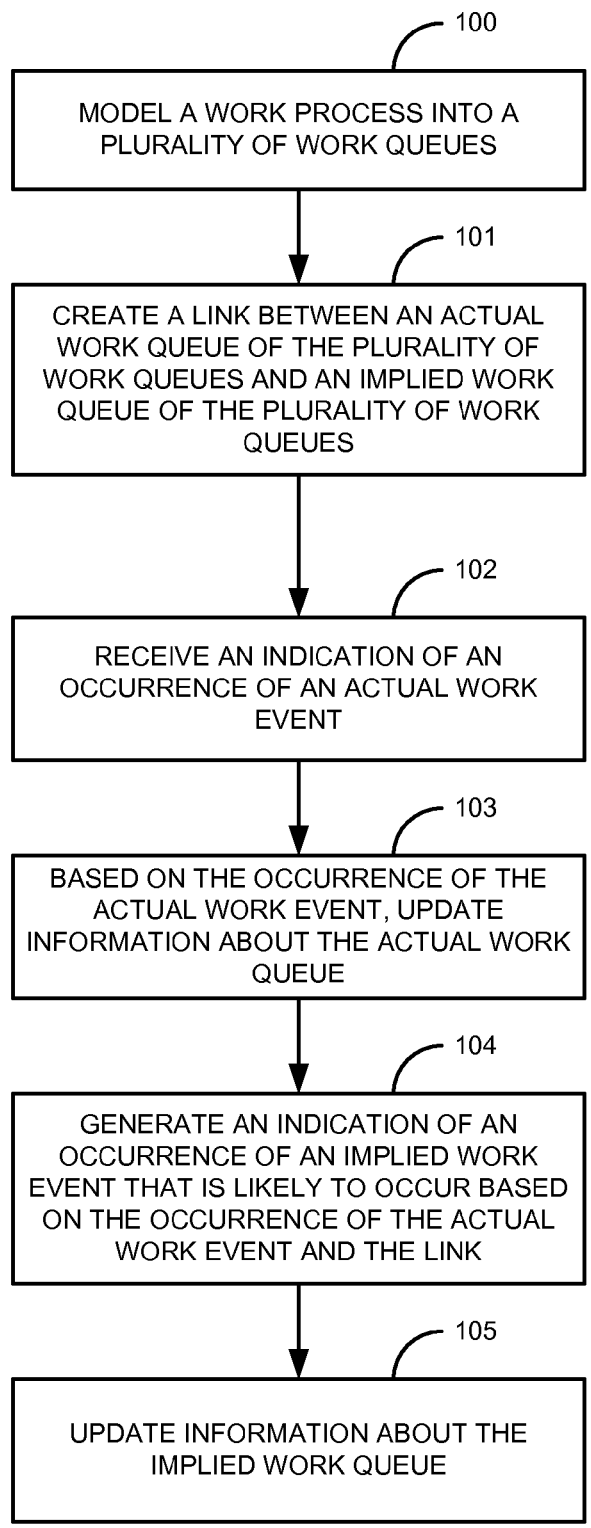
FIG. 1 is a flow diagram that illustrates a method for collecting work volume data.

FIG. 1 is a flow diagram that illustrates a method for collecting work volume data. In general, this workforce management system is used to collect data about the volume of work that will result when a task is completed or a work event occurs. The collected data is used to forecast what resources will be necessary to complete other tasks that will occur as a result of the task or work event. This way, resources can be moved from areas that have too many resources to areas that have too few resources.

In operation 100, a work process is modeled into work queues. A work process comprises one or more work queues that track the steps of the work process. For example, in banking, a method of processing checks would be a work process. The processes of opening envelopes that contain checks, verifying checks, and storing checks are examples of work queues. In this example, the work process of processing checks is modeled into the work queues of opening checks, verifying checks, and storing checks.

When work arrives or leaves a work queue, it is a work event. In the above example, when a check arrives to be opened and this is entered into the system, it is an arrival work event. An arrival work event would increase the amount of work to be done in the opening envelopes work queue. Adding an arrival is a means of entering volume into the system. Typically adding an arrival value for a queue increases the inventory of that queue by that value.

Two other types of work events are checkin and checkout work events. The checkout work event identifies a quantity of inventory as being moved to another queue (such as a quantity of work being worked on by a particular worker). Checking work out from a queue decreases the inventory level of that queue by that value. It also increases the Work In Progress (WIP) of the receiving queue by that value.

When work tied to a queue that has been checked out is completed, it can be checked back in with a checkin event. The checkin event process reduces the amount from the WIP tally for that queue by the value of the Checkin event.

The modeled work queues are organized into work queues and implied work queues. A work queue is a step in the workflow process where the quantity of work waiting to be done (e.g., inventory), or in the process of being done (e.g., WIP), at that step is measured or externally entered into the system. An implied work queue is a step in the workflow process where the quantity of work at that step is not measured or externally entered into the system. Instead, the amount of inventory and WIP associated with an implied work queue is determined by implied work events.

A work event (or actual work event) is a work event that is measured or externally entered into the system. Typically, this would involve a worker or manager entering in an arrival, checkout, or checkin event into the system. Work events that are externally entered into the system as may start an implied workflow of implied work events. These implied work events may be chained so that one implied work event triggers other implied work events.

An implied work event is not an actual event that is entered into the system (e.g., as in a worker entering an arrival, checkin or checkout event) by a user or automated equipment. Instead, an implied work event is an event that is implied to happen based on the knowledge of the workflow and the entry into the system of an actual work event.

For example, it may be known that checks are verified after they are received. Accordingly, completing the work of verifying checks may be implied from the event of completing the opening a number of envelopes that contain checks. Likewise, storing a certain number of checks may be implied from completing the verification of a quantity of checks. Modeling the work process into work queues, implied work queues, work events and implied work events may be accomplished by a user entering the information into a computer.

In operation 101, a link is created between a work queue and an implied work queue. A link may be represented by a data structure in a computer. A link is an association of data about what will likely occur when an actual work event happens or a prior implied work event happens. The information that an actual work event happened may be entered into the workforce management system by a user, or may be entered by automated means.

To illustrate links, consider an example where there is a work queue of opening envelopes and an implied work queue of verifying checks. A link may be created in the system that specifies that for each envelope arriving at the open envelopes queue, a check will arrive at the verify checks queue one day later. Accordingly, for every arrival work event that affects the opening envelopes queue, the system will generate an implied work event to update the inventory and/or WIP in the verify checks queue. Therefore, the workforce management system processes the implied events of new checks arriving into the verification queue as if it had been entered by a user (even though it had not.)

Implied queues may be linked to other implied queues thereby triggering a chain of implied events. For example, the implied event of a new check being entered into the verification queue may trigger a link to an error resolution queue. This link may indicate that only some percentage (for example 1%) of the checks entered into the verification queue results in a check going to the error resolution queue. The links from open envelope queue to the verification queue to the error resolution queue is a chain of implied events. In the above example, an actual event of one hundred envelopes arriving at the open envelopes queue would trigger an implied event of one hundred checks arriving in the verification queue which, in turn, would trigger an implied event of one check arriving in the error resolution queue. The workforce management system uses the entries of work into these queues to perform its functions.

The data associated with a link may indicate a variety of data such as time, percentages, work volume, units of work, work in progress, and the like. The data associated with the link may be generated based on historical data that is created and stored from previous iterations of the process. The data associated with the link may also be created by a user. The data associated with a link may also include an "event state." An event state is an attribute associated with a link that determines when work moves from an actual or implied work queue to an implied queue. The event state reflects when work arrives at a work queue, when work is in progress and when work is completed.

In operation 102, an actual work event is received. Receiving the work event corresponds to when the work event occurs or is entered into the system. For example, a work event may be received when a user enters an arrival work event indicating that 100 envelopes have arrived at the open envelopes queue. In another example, a work event may be received via an automated measurement. An example of an automated measurement is a page count from a scanner that is coupled to the workforce management system.

In operation 103, information about the work queue is updated. Using the above example, the arrival event indicating one hundred envelopes have been received, would initiate an update of the inventory (and possibly WIP) values associated with the open envelopes queue. Other information may be recorded in operation 103. For example, the time the arrival event was entered, the time the envelopes were opened, the number of envelopes opened, the number of checks in each envelope, who opened the checks, and the like.

Based on the receipt of the work event in operation 102 and the link between the work event and the implied work queue, an implied work event is generated in operation 104. The implied work event that is generated is based on the modeled work process from operation 100 and the link that was created between the work queue and the implied work queue in operation 101. In the above example, based upon the entry of an arrival work event of one hundred envelopes, an implied work event that indicates the arrival of one hundred checks into the verification queue is generated in operation 104. The link between the work queue of opening envelopes and the implied work queue of verifying the checks may indicate that, for example, it will take two hours for the checks to arrive in the verification queue. Accordingly, the implied arrival event indicating that one hundred checks have arrived in the verification queue will be associated with a time that is two hours later than the actual arrival event for the one hundred envelopes arriving at the open envelopes queue.

Information about the implied work queue is then updated in operation 105. In the above example, this information could include the inventory (or WIP) of checks in the verification queue. Other information such as who verified the checks and the time required to verify the checks may also be recorded. Information about the implied work event may indicate time, percentages, work volume, units of work, work in progress, and the like. Because of the implied work events that update values in the implied work queues, resources can be allocated appropriately to the workflow steps associated with implied work queues without actually having to measure or enter information about those workflow steps.

Figure 2:
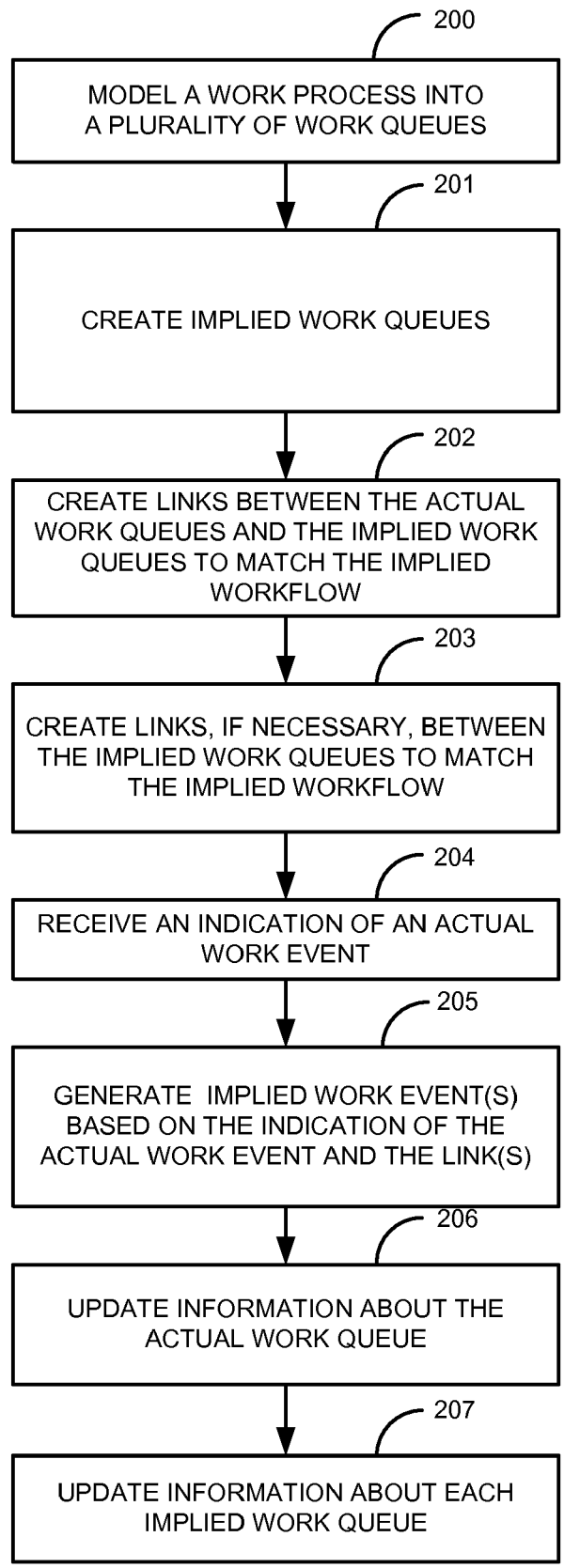
FIG. 2 is a flow diagram that illustrates a method for collecting work volume data.

FIG. 2 is a flow diagram that illustrates a method for collecting work volume data. In operation 200, a work process is modeled into work queues. A work process contains one or more actual work queues and one or more implied work queues. One or more implied work queues are created in operation 201.

Figure 3:
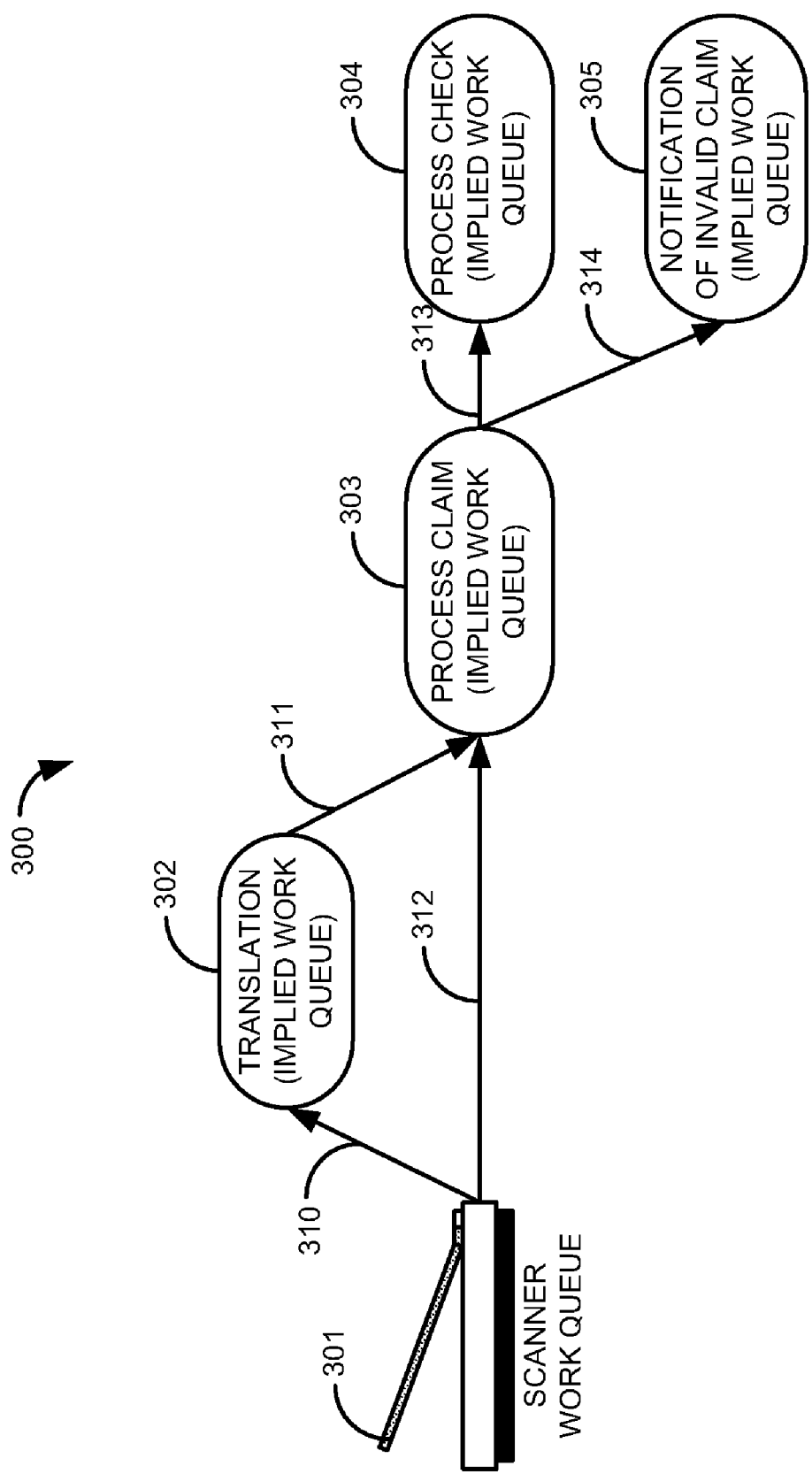
FIG. 3 is a block diagram that illustrates an example implied work event flow.

An implied workflow comprises the steps from a work queue to the last implied work queue (as illustrated, for example, in FIG. 3). In operation 202, links may be created between actual work queues and implied work queues to match the implied workflow. For example, a link may be created between a work event and an implied work event that was created in operation 201.

In operation 203, links may be created between implied work queues. These links may form chains of implied work queues. For example, a link may be created between a first implied work queue and a second implied work queue. Both the first implied work queue and second implied work queue would have been created in operation 201.

In an example, an implied work event flow may comprise a work queue, a first implied work queue, and a second implied work queue. The workflow would be from the work queue, to the first implied work queue, and then to the second implied work queue. Each of these work queues is associated with some amount of inventory or WIP in the workforce management system. The modeling of a work process, creating of implied work queues, creating links between work queues and the implied work queues, the creation of links between implied work queues, and the association of these links and queues to work events and implied work events may be accomplished by a user or by a computer A work event is received in operation 204. In operation 205, one or more implied work events are generated based on the received work event and the one or more links that were created in operations 202 and 203.

Upon receiving the work event in operation 204, information about the work queue is updated in operation 206. Information about the work queue may indicate inventory, time, percentages, work volume, units of work, WIP, and the like. Based upon the receipt of the work event in operation 204, information about each implied work queue is updated in operation 207. In an embodiment, this information may be updated before an implied work event occurs. In an embodiment, this information may be updated when each implied work event, if measured, would be complete. In an embodiment, this information may be updated after the completion of an actual work event. Information about each implied work queue may indicate inventory, time, percentages, work volume, units of work, WIP, and the like.

FIG. 3 is a block diagram that illustrates an example implied workflow. To illustrate, consider an implied workflow 300 that is an insurance claim process. The implied workflow 300 comprises: a scanner work event 301; a translation implied work queue 302; a process claim implied work queue 303; a process check implied work queue 304; and, a notification of invalid claim implied work queue 305.

Link 310 is between scanner work queue 301 and translation implied work queue 302. Link 311 is between translation implied work queue 302 and process claim implied work queue 303. Link 312 is between scanner work queue 301 and process claim implied work queue 303. Link 313 is between process claim implied work queue 303 and process check implied work queue 304. Link 314 is between process claim implied work queue 303 and notification of invalid claim implied work queue 305. The linking of work queues forms a chain of work queues.

The example insurance claim process is modeled into scanner work queue 301, translation implied work queue 302, process claim implied work queue 303, process check implied work queue 304, and notification of invalid claim implied work queue 305. Implied work queues 302-305 are modeled to match implied workflow 300. Implied work queues 302-305 may be created by a user. Implied work queues 302-305 may be generated by a computer based on historical or other data.

Link 310 is created between scanner work queue 301 and translation implied work queue 302. Link 312 is created between scanner work queue 301 and process claim implied work queue 303. Link 311 is created between translation implied work queue 302 and process claim implied work queue 303. Link 313 is created between process claim implied work queue 303 and process check implied work queue 304. Link 314 is created between process claim implied work queue 303 and notification of invalid claim implied work queue 305. Links 310-314 may be created by a user. Links 310-314 may be generated by a computer based on historical or other data. The historical data used to create a link may be based on the time required to accomplish the steps of an implied queue, volume of work, duration, units of work, work in progress, and the like.

Consider an example where link 310 indicates that 20% of the insurance claim forms scanned will need to be translated and link 312 indicates that 80% of the insurance claim forms will not need translation and are ready for processing. Links 311 and 312 may also have an associated time value. For example, link 311 may have a time value that indicates that two days elapse between an arrival at translation implied work queue 302 and an arrival at process claim implied work event 303.

In this example, further consider a case where link 313 indicates that 75% of claims are valid and are ready for processing checks and link 314 indicates that 25% of claims are invalid and require notification of an invalid claim. Links 313 and 314 may also have an associated time value. For example, link 313 may have a time value indicating that twenty minutes elapse between arrival at the process claim queue and arrival at process check queue. Link 314 may have a time value indicating that thirty minutes are required between arrival at process claim queue and arrival at notification of invalid claim queue.

The "time delays" between work flowing from one work queue to the next is achieved through the notion of a custom pattern (e.g., distribution of weights over time) which is applied to the volume of work flowing from work queue to work queue (actual or implied) associated with the link. The pattern has the effect of shifting volumes of work associated with different time periods to simulate how work would optimally have been complete by in downstream work queues in the work flow. The workforce management system forecasts staffing levels at the various work queues based on the time and volume distribution at each work queue.

When a work event is entered that affects scanner work queue 301, the system generates implied work events based on the modeled work process and the one or more links created between scanner work queue 301 and the implied work queues 302 and 303. For example, when a work event that changes the inventory at scanner work queue 301 is received, a work event that changes the inventory or WIP at translation implied work queue 302 is generated based on link 310. Also, a work event that changes the inventory or WIP at process claim implied work queue 303 is generated based on link 312.

When a work event that affects scanner work queue 301 is received, information is updated about scanner work queue 301. For example, the inventory of documents to be scanned, the document being scanned (WIP). Other information such as the time each document was scanned, who scanned the document, the number of pages of each document, and the and the like may also be recorded.

Based upon information about the actual work event, and the links between work events (both actual and implied) information is updated about implied work events. For example, as a result of the scanner entering a work event that one hundred letters have been scanned, the system may update translation implied work queue to indicate that twenty forms are waiting to be translated. Likewise, when implied work queue of process claim 303 updates to show that eighty forms are ready for the process check step, the system may update the process check queue to indicate that eighty more checks are waiting to be processed. In this example, information indicating that in two days another twenty forms from the translation implied work queue will be added into the process claim implied work queue may also be updated.

In this way, and using the above example, a workforce management system may allow proper resources to be allocated to the translation department. For example, if twenty claims are ready for translation and a person can translate five claims in two days, it will be necessary to have four translators to process the twenty claims in two days. If there are currently three translators working on translation, a fourth translator can be moved to the translation department to handle the project work load. Likewise, the proper resources can be allocated to claim processing so that the eighty claims can be processed on schedule. As the process flows through the implied events, resources can be allocated based on the projected resources required for the next implied event in the flow. For example, as claims are processed, the proper resources can be allocated for check processing and invalid claim notification.

Figure 4:
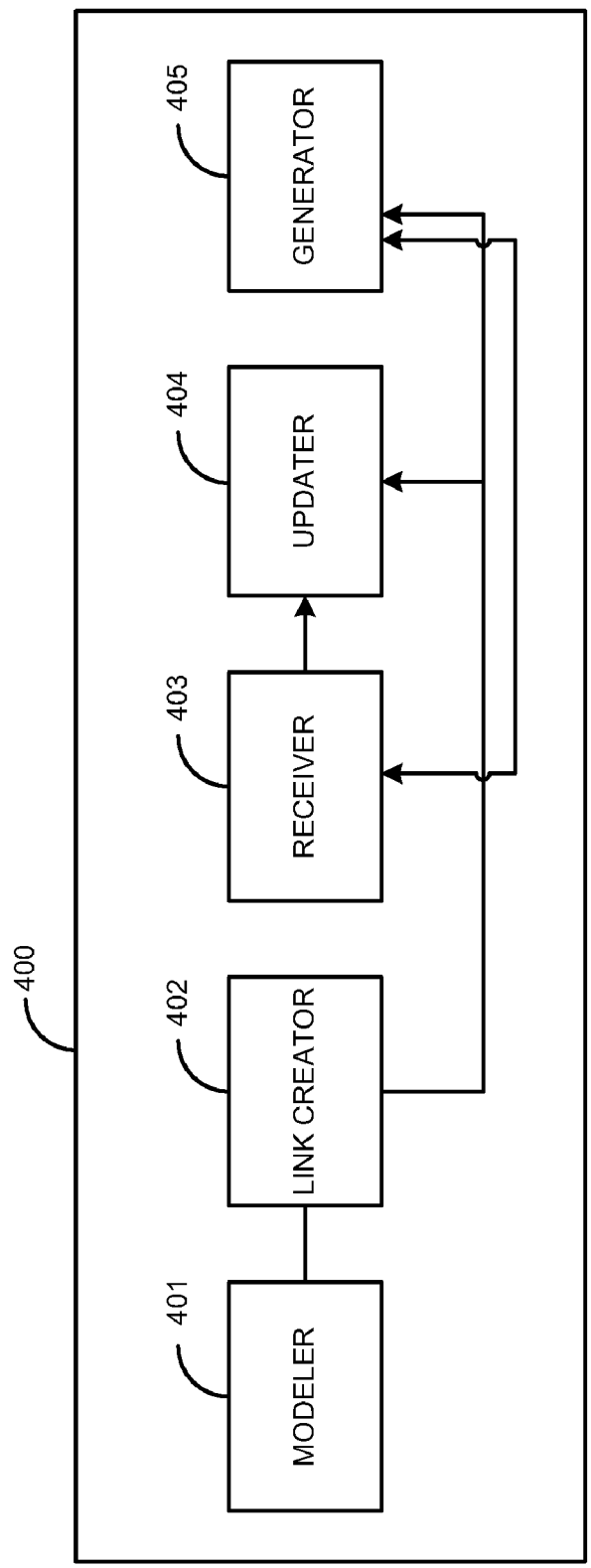
FIG. 4 is a block diagram that illustrates a system for collecting work volume data.

FIG. 4 is a block diagram that illustrates a system for collecting work volume data 400. The system for collecting work volume data 400 comprises: modeler 401; link creator 402; receiver 403; updater 404; and, generator 405. Modeler 401 communicates with link creator 402. Link creator 402 communicates with receiver 403. Receiver 403 communicates with updater 404. updater 404 communicates with generator 405.

Modeler 401 models a work process into work queues. A work process contains one or more work queues and one or more implied work queues. Link creator 402 creates a link between a work queue from modeler 401 and an implied work queue. A link is an association of data about what will likely occur when a work event or an implied work event occurs. An implied work event is not an actual event that has already happened. Instead, an implied work event is an event that will likely happen based on the occurrence of the work event.

Receiver 403 receives work events. Receiver 403 may receive actual work events or implied work events from generator 405. Updater 404 updates information associated with work queues (both actual and implied) base on these work events and the links created by link creator 402. Generator 405 generates implied work events based upon the received work events and the links.

In a computer, the work queues, implied work queues, and link may be represented by a forest of directed graphs to represent chaining relationship between the various work queues. Each node of the directed graph may include data to about work queue, event type, and the collection of nodes it is linked to, and other data such as the proportion of work to be passed along each linkage.

To rapidly access the nodes, a hash map may be used as an index. Every node that exists in the forest will be indexed in the hash map with a key which may be a function of source work queue and source event type. This helps in accessing a particular node fast. The desired node may be found in the forest of directed graphs directly from the hash map without having to recursively traverse the forest of directed graphs. In addition, all the nodes may be visited without regard to the structure of the directed graphs by iterating through the entries in the hash map.

The system for collecting work volume data 400 may perform the steps of a routine, which, for the purposes of this illustration, will be called CreateVCTEvent. The steps of CreateVCTEvent may also be performed as part of the methods for collecting work volume data illustrated in FIGS. 1 and 2.

CreateVCTEvent takes an event type and/or a user selection into account. CreateVCTEvent processes the following steps: (a) if the event being created occurs at a point in history (versus "now"), a balance in time is generated for inventory and WIP; (b) balance deltas and applicable periods are calculated based on the event type, replacement status, etc.; (c) balance changes are validated and applied to all events within each of the one or more applicable date ranges; (d) if the update causes any balance to fall below zero, the entire process is halted, and rolled back and negative balance exception is thrown; and, (e) implied events down the chain are generated, if applicable, by recursively calling CreateVCTEvent with the appropriate parameters.

In step (a), the event being created may be an actual event or an implied event. Balances in CreateVCTEvent may be part of the information about work queues (implied or actual) or information about work events (implied or actual) that is recorded.

Modeler 401, link creator 402, receiver 403, recorder 404, and generator 405 may be implemented on any system or computer configured with processing circuitry, such as a server, a personal computer, and the like. Modeler 401, link creator 402, receiver 403, recorder 404, and generator 405 may be in a single system or distributed between multiple systems. Modeler 401, link creator 402, receiver 403, recorder 404, and generator 405 may also communicate directly with each other. Modeler 401, link creator 402, receiver 403, recorder 404, and generator 405 may communicate via wireless or wireline connections.

Figure 5:
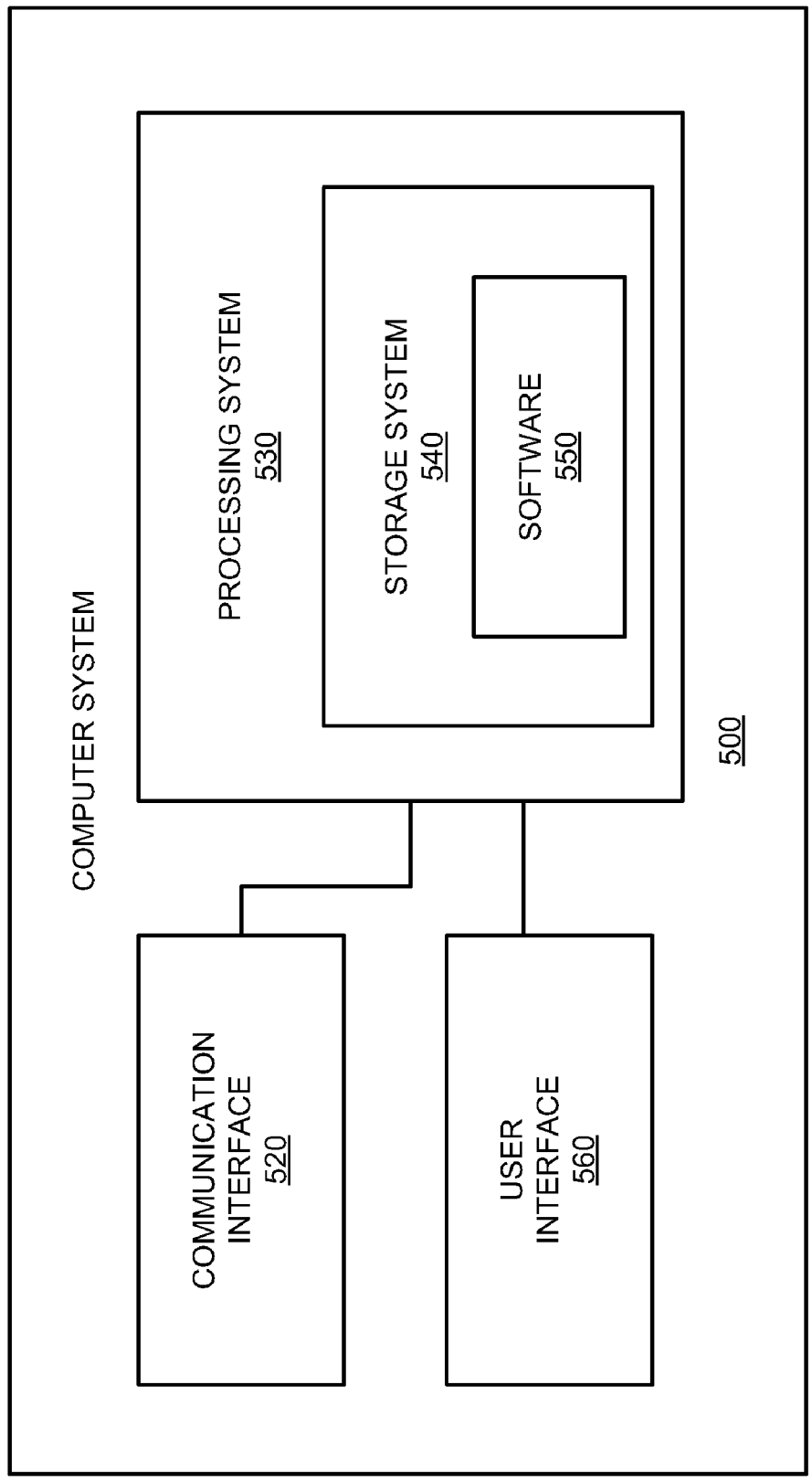
FIG. 5 illustrates a block diagram of a computer system.

FIG. 5 illustrates a block diagram of a computer system. Computer system 500 includes communication interface 520, processing system 530, and user interface 560. Processing system 530 includes storage system 540. Storage system 540 stores software 550. Processing system 530 is linked to communication interface 520 and user interface 560. Computer system 500 could be comprised of a programmed general-purpose computer, although those skilled in the art will appreciate that programmable or special purpose circuitry and equipment may be used. Computer system 500 may be distributed among multiple devices that together comprise elements 520-560.

Communication interface 520 could comprise a network interface, modem, port, transceiver, or some other communication device. Communication interface 520 may be distributed among multiple communication devices. Processing system 530 could comprise a computer microprocessor, logic circuit, or some other processing device. Processing system 530 may be distributed among multiple processing devices. User interface 560 could comprise a keyboard, mouse, voice recognition interface, microphone and speakers, graphical display, touch screen, or some other type of user device. User interface 560 may be distributed among multiple user devices. Storage system 540 could comprise one or more computer-readable storage medium such as a disk, tape, integrated circuit, server, or some other memory device. Storage system 540 may be distributed among multiple memory devices.

Processing system 530 retrieves and executes software 550 from storage system 540. Software 550 may comprise an operating system, utilities, drivers, networking software, and other software typically loaded onto a computer system. Software 550 could comprise an application program, firmware, or some other form of machine-readable processing instructions. When executed by processing system 530, software 550 directs processing system 530 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a workforce management system, comprising:
   modeling a work process into a plurality of work queues;
   creating a link between an actual work queue of the plurality of work queues and an implied work queue of the plurality of work queues;
   receiving an indication of an occurrence of an actual work event that occurred that causes a change to the actual work queue;
   updating information associated the actual work queue based on the occurrence of the actual work event; and
   based upon the occurrence of the actual work event and the link, generating an indication of an occurrence of an implied work event that occurs and updating information associated with the implied work queue; and creating a second link from the actual work queue to another implied work queue; and creating a second link between the implied work queue and another implied work queue.

2. The method of claim 1, wherein the link is created based on historical data.

3. The method of claim 1, wherein updating the information associated with the actual work queue is based on an item selected from a group consisting of inventory, time, percentages, work volume, units of work, and work in progress.

4. The method of claim 1 further comprising:
   generating an indication of an occurrence of another implied work event that occurs and updating information associated with another implied work queue.

5. The method of claim 1 wherein when the indication of the occurrence of the implied work event is generated, the implied work event has not yet occurred.

6. A computer system for operating workforce management system, comprising:
   a modeler that models a work process into a plurality of work queues;
   a link creator that creates a link between an actual work queue of the plurality of work queues and an implied work queue of the plurality of work queues;
   a receiver that receives an indication of an occurrence of an actual work event that occurred that causes a change to the actual work queue;
   an updater that updates information associated with the actual work queue based on the occurrence of the actual work event; and
   a generator that generates an indication of an occurrence of an implied work event that occurs based upon the occurrence of the actual work event and the link, and wherein based upon the implied work event the updater updates information associated with the implied work queue; and wherein the link creator creates a second link from the actual work queue to another implied work queue; and wherein the link creator creates a second link between the implied work queue and another implied work queue.

7. The computer system of claim 6, wherein the link is created based on historical data.

8. The computer system of claim 6, wherein updating the information associated with the actual work queue is based on an item selected from a group consisting of inventory, time, percentages, work volume, units of work, and work in progress.

9. The computer system of claim 6 wherein the generator generates an indication of an occurrence of another implied work event that occurs and wherein the updater updates information associated with the another implied work queue based on the another implied work event.

10. The system of claim 6 wherein when the indication of the occurrence of the implied work event is generated, the implied work event has not yet occurred.

11. A computer-readable storage medium comprising instructions stored thereon for operating a computer system for operating a workforce management system, wherein the instructions, when executed by the system for collecting work volume data, at least direct the computer system for operating a workforce management system to:
    model a work process into a plurality of work queues;
    create a link between an actual work queue of the plurality of work queues and an implied work queue of the plurality of work queues;
    receive an indication of an occurrence of an actual work event that occurred that causes a change to the actual work queue;
    update information associated the actual work queue based on the occurrence of the actual work event; and
    based upon the occurrence of the actual work event and the link, generate an indication of an occurrence of an implied work event that occurs and update information associated with the implied work queue; wherein the instructions further direct the system to:
    create a second link from the actual work queue to another implied work queue; and wherein the instructions further direct the system to:
    create a second link between the fir-s4 implied work queue and another implied work queue.

12. The computer-readable storage medium of claim 11, wherein the link is created based on historical data.

13. The computer-readable storage medium of claim 11, wherein updating the information associated with the actual work queue is based on an item selected from a group consisting of inventory, time, percentages, work volume, units of work, and work in progress.

14. The computer-readable storage medium of claim 11 wherein the instructions further direct the system to:
    generate an indication of an occurrence of another implied work event that occurs and updating information associated with the another implied work queue.

* * * * *